May 24, 1960  J. R. KETCHUM  2,937,528
FORCE RATIO RESPONSIVE DEVICE
Filed Aug. 1, 1955
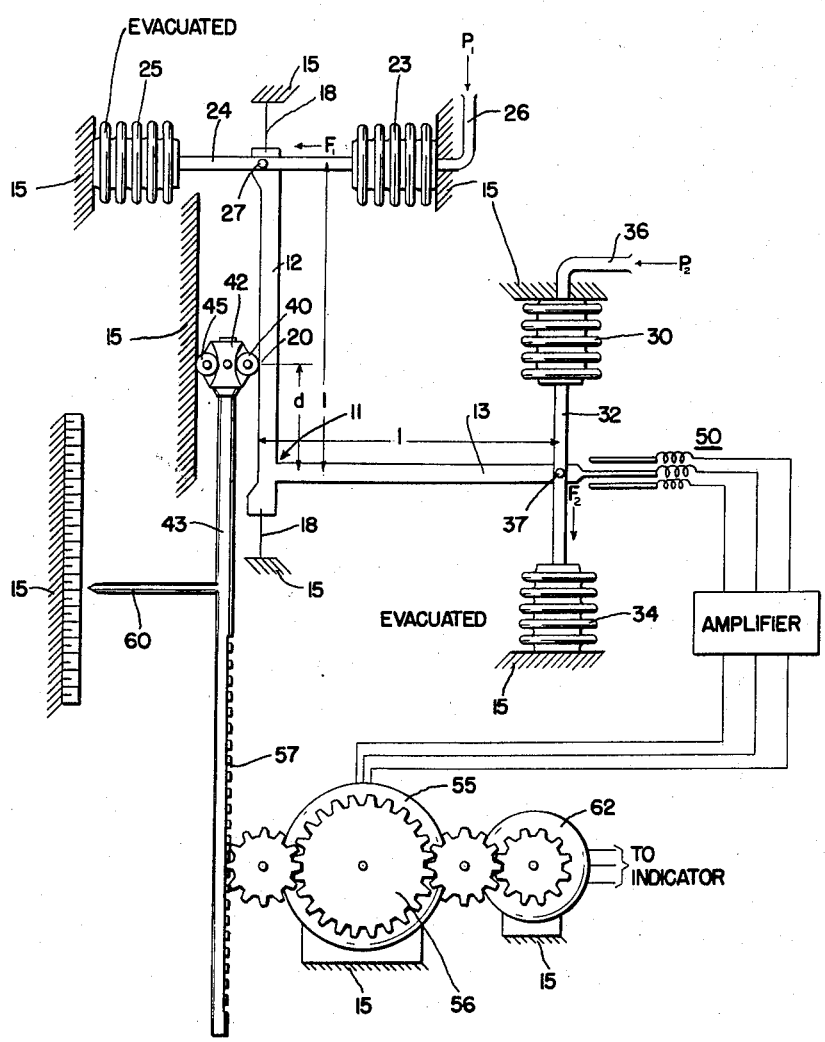
INVENTOR.
JAMES R. KETCHUM
BY
ATTORNEY

2,937,528
FORCE RATIO RESPONSIVE DEVICE

James R. Ketchum, Crystal Village, Minn., assignor to Minneapolis-Honeywell Regulator Company, Minneapolis, Minn., a corporation of Delaware Filed Aug. 1, 1955, Ser. No. 525,713

6 Claims. (Cl. 73—407)

This invention relates to mechanical mechanisms and more particularly to a mechanical mechanism for a pressure ratio system and to the use of force moment comparison for indication and control purposes.

An object of my invention is to provide a force ratio responsive device.

Another object of my invention is to provide a force ratio responsive device that will give remote indication of force ratio.

Yet another object of my invention is to provide a force ratio responsive device that can be utilized for control purposes.

Other objects of my invention will in part be obvious and in part be described when the following specification is read in conjunction with the drawing which is a mechanical schematic of an embodiment of my invention.

A member 11 shown in the form of a lever with mutually perpendicular arms 12 and 13 is suspended in a frame 15 by reeds 18. As will be described below the movement of member 11 is small enough so that any effect of the reeds 18 is negligible. An adjustable fulcrum 20 cooperates with the arm 12 of member 11 and is guided in frame 15 such that the guiding surface in frame 15 is parallel to arm 12 for all null conditions (to be explained below).

Bellows 23 is fixed at one end to frame 15 and its movable end is attached by member 24 to an evacuated reference bellows 25. Bellows 23 has a pressure inlet 26 which allows bellows 23 to be subjected to a pressure $P_1$ resulting in a force $F_1$ applied to arm 12 through member 24 which is attached at pivot 27 to arm 12. Similarly bellows 30 is fixed at one end to frame 15 and its movable end is attached by member 32 to an evacuated reference bellows 34. Bellows 30 has a pressure inlet 36 which allows bellows 30 to be subjected to a pressure $P_2$ resulting in a force $F_2$ applied to arm 13 through member 32 which is attached at pivot 37 to arm 13.

Fulcrum 20 is shown as a roller 40 on a carriage 42 positioned by a shaft 43 and guided by a roller 45 on carriage 42 cooperating with frame 15. Thus the fulcrum 20 for member 11 can be positioned anywhere along the length of arm 12 of member 11.

The moments of the forces $F_1$ and $F_2$ about fulcrum 20 will cause member 11 to tend to rotate unless they are in balance. A signal generator 50 shown as a three-plate capacitor type pickoff will sense any movement of member 11 about fulcrum 20. This signal will be amplified and actuate a motor 55 and gear train 56. Gear train 56 cooperates with a gear rack 57 on shaft 43 which will reposition fulcrum 20 until the moments of forces $F_1$ and $F_2$ are again in balance about fulcrum 20.

For the use of my invention for ratio indication it can be seen from the drawing that the force $F_1$ will be directly proportional to $P_1$ and the force $F_2$ will be directly proportional to $P_2$ assuming the effective areas of the bellows are equal. Summing the moments about fulcrum 20 for a null or balanced condition:

$$\epsilon M = F_1(1-d) - F_2 1 = 0$$
$$F_1(1-d) = F_2 1$$
$$\frac{F_1}{F_2} = \frac{1}{1-d}$$

which shows that the ratio of $F_1$ to $F_2$ is indicated by the distance $d$ or the position of fulcrum 20 on arm 12. It can be seen that the moment arm of the force $F_2$ will be the constant indicated as 1, therefore for the embodiment shown the larger pressure would of necessity have to be applied at bellows 23. For a ratio of 1 to 1, the distance $d$ would equal 0 and as $d$ increased the ratio $F_1$ to $F_2$ would increase. The length of arms 12 and 13 would not of necessity need to be made equal and if arm 12 is longer than arm 13 then either pressure could be greater. An indicator pointer 60 attached to shaft 43 cooperates with indicia on frame 15 to indicate the distance $d$ and hence the ratio of the forces $F_1$ to $F_2$. As $F_1=P_1A_{23}$ and $F_2=P_2A_{34}$ if the effective areas $A_{23}$ and $A_{34}$ of bellows 23 and 34 are equal then by substitution:

$$\frac{F_1}{F_2} = \frac{1}{1-d}$$
$$\frac{P_1 A_{23}}{P_2 A_{34}} = \frac{1}{1-d}$$
$$\frac{P_1}{P_2} = \frac{1}{1-d}$$

hence the distance $d$ will indicate the ratio of $P_1$ to $P_2$.

If remote indication is desirable a synchro 62 can be added to engage the gear train 56 and position a remote dial indicator (not shown). The amount of rotation of the gear train 56 will effect the amount of rotation of the synchro 62 and hence the positioning of the dial indicator.

My invention can also be used as the sensing unit for a control means in which case a potentiometer or other type of signal generator can be substituted for the synchro motor to provide the electrical signal.

I do not intend to limit my invention to the specific components shown in the drawing as one skilled in the art can see that many substitutions or changes can be made without departing from the spirit of my invention. For example, various types of signal generators could be used in place of the capacitor pickoff shown in the drawing. A differential transformer or plain electrical contacts operating a relay and hence a reversible motor could be used. Also my invention is not limited to the particular structure shown for applying the forces $F_1$ and $F_2$ to member 11. Nor do I intend to limit my invention to bellows as the condition sensing elements, as any other type such as bimetal, or any condition that may be resolved into forces where the ratio of one to another is desirable can be used. A hydraulic or pneumatic servomotor could be used in place of the electric motor and gear train to reposition the fulcrum 20 and rebalance member 11. Many other substitutions could be made that would not alter the spirit of my invention.

Some of the salient features of my invention are: the ratio determination is inherent in the mechanical sensor, the forces due to pressure are directly related to the signal generator so that no electrical network is needed to establish ratio. The force balance system is unique in that a minimum of frictional loads affect the wanted output. The indication is provided by the powered section and any load exerted to produce indication or control does not produce hysteresis or reversal loss. The signal generator merely monitors and directs the positioning of the motor to provide rebalance and the proper indication or control signal.

What is claimed and desired to be secured by United States Letters Patent is:

1. In a pressure ratio responsive device a frame, a lever with first and second mutually perpendicular arms, an adjustable roller fulcrum having an axis perpendicular to the plane of said lever, positioned by a shaft and a gear rack and guided in said frame parallel to and cooperating with said first arm, reed suspension means normally positioning said lever in said frame so as to allow small pivotal movement of said lever about said fulcrum, first and second bellows each fixed at one end to said frame and applying a force at the other end to one each of said arms of said lever, the line of application of each of said forces being perpendicular to its respective arm and in the same plane as the lever, said forces transmitted to said lever being proportionate to pressure applied to each of said bellows and exerting opposing turning moments on said lever about said fulcrum, the pressures in each of said bellows tending to cause a movement of said lever relative to said frame, said lever being in a normal stationary position when said fulcrum is positioned to balance the moments of said forces on said arms about said fulcrum, position sensing means cooperating with said lever, a motor and gear train mounted in fixed relation to said frame cooperating with said gear rack, said motor and gear train being actuated by said position sensing means in an unbalanced condition to move said adjustable fulcrum to a balanced condition, and a synchro actuated by said gear train to position an indicator to indicate the position of said fulcrum and hence the ratio of said two pressures.

2. A pressure ratio responsive device comprising a frame, a member, a fulcrum, reed suspension means normally positioning said member in said frame and allowing movement of said member about said fulcrum, first and second bellows each fixed at one end to said frame and applying mutually perpendicular forces at their other ends to said member at points displaced from said fulcrum, said forces transmitted to said member being proportionate to pressure applied to each of said bellows and exerting opposing turning moments on said member about said fulcrum, said fulcrum having an axis perpendicular to the plane of said member, said fulcrum cooperating with said member and movable with respect thereto, movement of said fulcrum being parallel to the line of application of one of said forces, the pressure in each of said bellows tending to cause a movement of said member relative to said frame, said member being in a normal stationary position when said fulcrum is positioned to balance the moments of said forces on said member about said fulcrum, a signal generator responsive to an unbalance of moments on said member about said fulcrum, motor means actuated by a signal from said signal generator upon an unbalance of said member for repositioning said shaft and fulcrum until said member is again in balance, and indicating means indicating the position of said fulcrum and hence the ratio of said two pressures.

3. A force ratio responsive device comprising a pivotal member, means for applying two mutually perpendicular forces to said member, a fulcrum having an axis perpendicular to the plane of said member, said fulcrum cooperating with said member and movable with respect thereto, movement of said fulcrum being parallel to the line of application of one of said forces, said forces being applied to said member at points displaced from said fulcrum and tending to cause pivotal movement of said member in opposite senses about said fulcrum, said member being in a normal position when said fulcrum is disposed to balance said forces on said member, and means for positioning said fulcrum to balance said member the position of said fulcrum being indicative of the ratio of said forces.

4. A force ratio responsive device comprising a frame, a pivotal member, means for applying two mutually perpendicular forces to said member including first and second condition sensing means, said forces transmitted to said member being proportionate to the conditions sensed at said condition sensing means, a fulcrum having an axis perpendicular to the plane of said member, said fulcrum cooperating with said member and movable with respect thereto, movement of said fulcrum being parallel to the line of application of one of said forces, said condition sensing means exerting turning moments on said member in response to said conditions, said turning moments being directed in opposite senses about said fulcrum, said member being in a normal stationary position when said fulcrum is positioned to balance the moments of said forces on said member about said fulcrum, means for positioning said fulcrum to balance said member, and means for indicating the position of said fulcrum and hence the ratio of said two conditions.

5. A force ratio device comprising a pivotal member, a fulcrum having an axis perpendicular to the plane of said member, said fulcrum cooperating with said member and movable with respect thereto, two force exerting sensing elements, mechanism for applying the forces generated in said elements to said member in mutually perpendicular directions at points displaced from said fulcrum such that said member is normally in a condition of balance about said fulcrum, the movement of said fulcrum being parallel to the line of application of one of said forces, a signal generator adapted to produce signals in response to movement of said member from said normal balanced condition, and mechanism to reposition said fulcrum to restore the balance of said member, the position of said fulcrum when said member is in said balanced condition being indicative of the ratio between the forces generated by said sensing elements.

6. In a force ratio responsive device, a frame, a member with first and second mutually perpendicular arms suspended to allow small pivotal movements in said frame, first condition sensing means applying a force on said first arm in a direction perpendicular to said first arm, second condition sensing means applying a force on said second arm in a direction perpendicular to said second arm, a movable fulcrum having an axis perpendicular to the plane of said member guided in said frame parallel to the line of action of one of the forces and cooperating with said first arm, a gear rack connected to said adjustable fulcrum, said forces exerting opposing turning moments on said member, said member being in a normal stationary position when said fulcrum is positioned to balance the moments of said forces on said arms about said fulcrum, position sensing means cooperating with said member, a motor and gear train mounted in fixed relation to said frame cooperating with said gear rack, said motor and gear train being controlled by said position sensing means when in an unbalanced condition to move said adjustable fulcrum to a balanced condition, and a synchro actuated by said gear train to position an indicator to indicate the position of said fulcrum and hence the ratio of the conditions sensed by said first and second condition sensing means.

References Cited in the file of this patent

UNITED STATES PATENTS

| | | |
|---|---|---|
| 2,302,713 | Paulin | May 23, 1942 |
| 2,441,468 | Brownscombe | May 11, 1948 |
| 2,487,310 | Chandler | Nov. 8, 1949 |
| 2,508,623 | Schaefer | May 23, 1950 |
| 2,538,824 | Andresen | Jan. 23, 1951 |
| 2,599,288 | Schaefer | June 3, 1952 |
| 2,734,736 | Payne | Feb. 14, 1956 |
| 2,740,295 | Perchonok | Apr. 3, 1956 |

FOREIGN PATENTS

| | | |
|---|---|---|
| 248,384 | Great Britain | May 25, 1927 |